US007988549B2

(12) United States Patent
Little

(10) Patent No.: US 7,988,549 B2
(45) Date of Patent: Aug. 2, 2011

(54) ELECTRONIC SYSTEM FOR PLAYING OF REEL-TYPE GAMES

(75) Inventor: David Little, Newtown (AU)

(73) Assignee: Lightning Box Games Pty Limited, Alexandria (AU)

( * ) Notice: Subject to any disclaimer, the term of this patent is extended or adjusted under 35 U.S.C. 154(b) by 794 days.

(21) Appl. No.: 11/859,893

(22) Filed: Sep. 24, 2007

(65) Prior Publication Data

US 2008/0076521 A1 Mar. 27, 2008

(30) Foreign Application Priority Data

Sep. 26, 2006 (AU) ................................ 2006905324
Dec. 21, 2006 (AU) ................................ 2006907161

(51) Int. Cl.
*A63F 13/00* (2006.01)

(52) U.S. Cl. ......... 463/20; 463/16; 273/138.1; 273/139; 345/670; 345/671; 715/758; 715/781; 715/788; 715/801

(58) Field of Classification Search .......... 463/1, 10–13, 463/16–21, 23, 25–27, 29–34; 273/138.1, 273/138.2, 139, 141 A, 142 B, 142 C, 142 J, 273/148 R, 429–432; 345/660–671; 715/759, 715/766, 781–783, 788, 794–795, 798, 802, 715/807, 758, 801
See application file for complete search history.

(56) References Cited

U.S. PATENT DOCUMENTS 5,742,272 A * 4/1998 Kitamura et al. ............. 345/667
5,890,962 A * 4/1999 Takemoto ....................... 463/20
6,033,307 A * 3/2000 Vancura .......................... 463/20
6,129,357 A 10/2000 Wichinsky
6,203,428 B1 3/2001 Giobbi et al.
6,215,490 B1 * 4/2001 Kaply ........................... 715/788
6,254,481 B1 * 7/2001 Jaffe ............................... 463/20
6,270,412 B1 * 8/2001 Crawford et al. ............... 463/20
6,471,208 B2 * 10/2002 Yoseloff et al. ........... 273/143 R
6,656,040 B1 * 12/2003 Brosnan et al. ................ 463/16
6,832,957 B2 12/2004 Falconer
6,860,810 B2 3/2005 Cannon et al.
6,950,993 B2 * 9/2005 Breinberg ...................... 715/801
6,960,134 B2 * 11/2005 Hartl et al. ...................... 463/20
7,008,319 B2 3/2006 Montgomery et al.
7,036,083 B1 * 4/2006 Zenith ........................... 715/758
(Continued)

FOREIGN PATENT DOCUMENTS

WO WO 01/82245 11/2001
(Continued)

*Primary Examiner* — Arthur O. Hall
(74) *Attorney, Agent, or Firm* — Gordon & Jacobson, PC

(57) ABSTRACT

There is disclosed an electronic gaming system (100) comprising one or more player interfaces (6, 7, 17), and a main video display screen (1). The system enables players to simultaneously play a plurality of reel-type games and to place bets on lines of the games. The system displays a plurality of display windows on the main display screen, each window being associated with a respective one of the simultaneously played games and displaying the reels of that game, each reel displaying reel indicia. The system is configured for any one of the games to enter a feature phase when a feature-triggering event occurs. At the start of the feature phase, all the display windows on the main screen, except the particular display window associated with the feature phase, reduce in size or disappear, while the size of the feature game's display window increases, and the other games are also suspended, until the feature phase is completed.

19 Claims, 9 Drawing Sheets

U.S. PATENT DOCUMENTS

| | | | | |
|---|---|---|---|---|
| 7,438,642 | B2 * | 10/2008 | Walker et al. | 463/30 |
| 7,577,914 | B1 * | 8/2009 | Stuple et al. | 715/764 |
| 7,625,280 | B2 * | 12/2009 | Singer et al. | 463/20 |
| 7,681,143 | B2 * | 3/2010 | Lindsay et al. | 715/788 |
| 7,730,418 | B2 * | 6/2010 | Wang et al. | 715/800 |
| 2002/0045474 | A1 * | 4/2002 | Singer et al. | 463/20 |
| 2002/0187836 | A1 * | 12/2002 | Meyer | 463/42 |
| 2003/0008702 | A1 * | 1/2003 | Meyer | 463/16 |
| 2004/0166936 | A1 * | 8/2004 | Rothschild et al. | 463/35 |
| 2005/0093240 | A1 | 5/2005 | Jones et al. | |
| 2005/0233794 | A1 * | 10/2005 | Cannon et al. | 463/16 |
| 2006/0160614 | A1 | 7/2006 | Walker et al. | |
| 2006/0178184 | A1 | 8/2006 | Gomez | |
| 2007/0060339 | A1 * | 3/2007 | Schultz et al. | 463/30 |

FOREIGN PATENT DOCUMENTS

| | | |
|---|---|---|
| WO | WO 2004/078297 | 9/2004 |

* cited by examiner

ELECTRONIC SYSTEM FOR PLAYING OF REEL-TYPE GAMES

TECHNICAL FIELD

This invention relates to an electronic system for playing reel-type games. In preferred embodiments, the invention relates to gaming machines of the type generally referred to as “slot machines”, “poker machines”, “pokies”, or “fruit machines”.

BACKGROUND OF THE INVENTION

A conventional mechanical slot machine is a device that uses a set of vertically oriented reels. Each reel comprises a plurality of symbols at various positions around the reel, only three of which are usually oriented towards the user. The reels are arranged next to each other so that the symbols that are oriented towards the user may be regarded as falling on one or more lines extending across the reels.

The machines are configured to allow players to play games on the machines. When a game is played on the machine, the reels rotate and then stop rotating. Once they have stopped, if there are particular predetermined combinations or arrangements of symbols on the reels which are oriented towards the player, prizes are awarded. The arrangement and relative position of the symbols oriented towards the player is referred to as the “outcome” of the game.

In the more modern electronic versions of these machines, a random number generator is used to determine the outcome of each game. Typically, the reels are not actual reels, but are simulated (or “pseudo”) reels—that is, images of reels presented on a display screen. In the description below, where reference is made to a reel, or the nature or operation of a reel, this is to be taken to include a reference to a simulated reel.

Each game is typically governed by a set of rules which determines whether a prize is awarded to the player, and the value of the prize, depending on the particular outcome of the game, and in particular, whether the outcome meets predetermined criteria.

One known game which has five reels is referred to as having a three-by-five display. This basis for this name is that, each reel, at any rotational position at which it stops rotating, has three circumferentially positioned symbols that are oriented towards the plays. Thus, with the reels being disposed adjacent to one another, the relevant three symbols of each of the reels together with those of the other reels are arranged in an array having three rows and five columns of symbols.

Each of the three rows is referred to as a “line”. While the word “line” in this context has historically only referred to a horizontal straight-line arrangement of symbols, the meaning has evolved over the years. The word “line” in this context now refers to an any arrangement of juxtaposed symbols, consisting of one symbol per reel, where each pair of adjacent symbols either fall in the same row of the array, or are one row removed from each other. Thus, a five-by-three reel game can have as many as 243 lines, 25 of which are shown in FIG. 9.

Typically, a player can place a particular bet on one or more lines of the game. The rules of the game may, for example, dictate that the occurrence of a certain combination of reel symbols falling on a predetermined line (as defined above) constitutes a win. The rules may also, for example, dictate the amount of a monetary award that is made to the player in the event that such a win is achieved, this amount bearing a predetermined relationship to (for example being a multiple of) the monetary amount of the bet placed by the player. If a game is played and no win is achieved, the amount bet by the player is usually forfeited. The amount that has been bet, and the amount that is awarded as a prize, is typically represented as a number of credits.

The video screen, apart from displaying the reels themselves, also typically reflects the current status of the player’s credits, including the total amount of credits remaining on the machine, the total value of the bet placed on the last game played, and the total amount won on the last game played.

FIG. 1 shows a slot machine similar to that of the prior art. The slot machine has a video screen 1 and an internal microprocessor (not shown). In order to play a game, the player first needs to purchase credits on the slot machine. This can be done by inserting coins (as indicted by the reference numeral 2), bank notes (as indicted by the reference numeral 3) or tickets (as indicted by the reference numeral 4) into the machine, or by electronic fund transfer.

The player interacts with the machine by pressing buttons 6 on a front panel. The video screen 1, which displays the features of the game, is touch-sensitive in most embodiments, allowing the player to also interact with the game by pressing selectors 7 displayed on the screen. When the buttons 6 or selectors 7 are depressed, this serves as a command to the machine, and the microprocessor processes the command and performs the associated functions.

One such function includes the selection, by the player, of the number of lines on which the player wishes to place bets and the number of credits the player wishes to bet on each such line. This makes up the total bet placed. The player starts the game by triggering the spin of the simulated reels by operating suitable controls on the machine. After the conclusion of the spin, the screen displays the outcome of the game and any prizes that are awarded.

Often, additional awards are allocated to players depending on the occurrence of specific outcomes or combinations of outcomes of a game or games. Such awards are often called “features” or, when they are constituted by further games, may be called “bonus games”. Players often have a preference for a particular game because they enjoy playing the feature of that game.

The feature is usually in the form of one or more bonus rounds of the game, which can consist of free games, games in which multiples of the standard prizes are available, re-spins in which a special set of reel strips (the set of symbols appearing on the reels) are used, a second screen in which the player is able to select special awards, or a combination of these.

It will be appreciated that the chance of a feature of a particular game occurring increases the longer that the player plays the game. Many experienced players learn to expect a feature to be awarded once a certain number of games have been played. If the number of games played before a feature is awarded significantly exceeds the number of games expected by a player, the player may become bored of the game. In light of this, and in an endeavor to balance the desire of machine operators not to offer too many features with the desire of players to derive excitement from the games played, many game designers strive for innovative ways of maintaining players’ interest in the games that they play.

One known way of attempting to enhance the experience of players is to provide gaming machines with a greater number of lines on which bets can be placed. However the desirability of this feature is limited due to the availability of another known incentive referred to as a “scatter prize” (or “scatter win” or “scatter pay”). This is a prize that is awarded based on a combination of particular reel symbols (“scatter symbols”) that do not fall on a single line as defined above, but which are in a scattered arrangement. Accordingly, the chance of a scatter prize being awarded is not dependant on the number of lines on which bets are placed, and therefore the incentive to bet on a greater number of lines is reduced.

Game designers have tried to enhance player enjoyment by increasing the number of scatter symbols appearing on the reels when players increase the amount of their bets, but it has been found that this negatively affects the integrity of the games. In addition, the fact that more scatter symbols are provided on the reels is not readily apparent to players, and this offsets the potential benefit to player enjoyment that might otherwise result from the greater number of such symbols.

Another approach is disclosed in U.S. Pat. No. 6,832,957. This patent discloses a gaming device having multiple sets of identical simulated reels. A player is able to place bets on pay lines on one or more sets of reels. One of the embodiments disclosed provides a variation on the traditional "scatter prize". A player is awarded credits or one or more bonus games as a "scatter pay" when a predetermined number of identical symbols appear on the sets of reels. The greater the number of sets of reels that are provided in a particular game, the greater the chance that the same gaming symbol will appear in that game. On one hand, this results in more frequent "scatter pay" awards being issued, with a resultant increase in player excitement. However, the gaming device disclosed in this patent does not derive any further benefit from the fact that this game involves a plurality of simultaneously played games.

While many establishments make a large number of the known types of gaming machines available for players to use, the machines typically operate independently of one another so that the game-playing experience is not shared between players. This can result in an inefficient use of gaming resources and limited player satisfaction.

Accordingly, it is an object of the present invention to overcome or ameliorate disadvantages or limitations of the prior art, or to provide an alternative thereto.

SUMMARY OF THE INVENTION

According to the invention there is provided an electronic gaming system comprising at least one player interface for enabling a player to interact with the system; a main video display screen; and a random number generator, wherein the system enables a player to simultaneously play thereon a plurality of reel-type games and to select parameters of said plurality of games, said parameters including at least one of game lines on which the player places bets and the amount that is bet per selected line, wherein the system is configured to have a plurality of display windows appear simultaneously on the main display screen, each window being associated with a respective one of the simultaneously played games and being adapted to display a plurality of reels pertaining to that respective game, each reel having a plurality of reel indicia arranged circumferentially thereon, wherein the system is configured for the random number generator to determine a particular outcome for each play of each game, that outcome being one of a plurality of possible outcomes, and being constituted by a particular arrangement of indicia of the reels pertaining to that game, wherein the system is configured for a particular one of the games to enter a feature phase when the outcome of at least one of the games constitutes a predetermined feature-triggering event, wherein the system is configured at the start of said feature phase for all of the display windows on the main display screen, except the particular display window associated with said particular game, to reduce in size or disappear from the main display screen and for the size of said particular display window to increase on the main display screen, at least until the feature phase is completed, and is wherein the system is configured for the play of all of the games other than said particular game to be suspended at least until the feature phase is completed.

In a preferred embodiment, the electronic gaming system is configured for the size of said particular display window to increase on the main display screen so as to occupy substantially the whole of the main display screen.

In a preferred embodiment, the electronic gaming system is configured for the play of said suspended games to resume after the feature phase of said particular game is completed.

Preferably, the electronic gaming system is configured for a plurality of the games to enter respective feature phases when outcomes of at least one of the games constitute respective predetermined feature-triggering events, and if such feature-triggering events occur while a feature phase of another game is underway, to cause the respective feature phases that have not yet been entered to be entered sequentially, with the play of all games other than that in the feature phase to be suspended, and for the play of the suspended games to be resumed after the sequential feature phases are completed.

In a preferred embodiment, the electronic gaming system is configured to cause the feature phase of the or each game to be entered in response to a feature-triggering event which is constituted by a predetermined outcome of a plurality of the games.

In a preferred embodiment, the electronic gaming system is configured to cause the feature phase of the or each game to be entered in response to a feature-triggering event which is constituted by a predetermined outcome of a single game.

In a preferred embodiment, the electronic gaming system comprises a slot machine which includes the main display screen and the player interface.

In a preferred embodiment, the electronic gaming system comprises a plurality of player interfaces for enabling each of a plurality of players, simultaneously, to play at least one of said plurality of reel-type games on the gaming system.

In a preferred embodiment, each interface comprises a display for indicating the status of bets placed on, and credits awarded to the respective player in relation to, said at least one game.

In a preferred embodiment, the electronic gaming system is configured such that, when the feature phase of a game is entered, each one of said plurality of players can continue to play that game only if that player had been playing that game before the feature phase of that game was entered.

In a preferred embodiment, the electronic gaming system is configured to enable each of said players to play the at least one reel-type game in accordance with the game parameters entered by that player.

In a preferred embodiment, the electronic gaming system comprises a plurality of slot machines, each including one of said plurality of player interfaces.

In a preferred embodiment, each player terminal comprises a terminal screen, the gaming system being configured for the display windows that appear simultaneously on the main display screen to also appear simultaneously on each terminal screen at which a player plays.

In a preferred embodiment, electronic gaming system comprises a personal computer configured to enable said simultaneous playing thereon of the plurality of reel-type games.

Preferably, the personal computer is configured to be connected to other personal computers on a network and to enable players to play said plurality of reel-type games via the network.

Preferably, the network includes the Internet.

In a preferred embodiment, the probability of each game entering a feature phase is lower, when that game is being played simultaneously with at least another one of the games, than when only that game is being played.

In one embodiment, the electronic gaming system may be configured to award a prize to a player when any of the games that that player is playing has a predetermined winning outcome, wherein the value of the prize is smaller when that game is being played simultaneously with at least another one of the games, than when only that game is being played.

In a preferred embodiment, the electronic gaming system is configured such that a portion of the amounts that are bet by the or each player on each game that is played is contributed to a jackpot pool, and such that a predetermined outcome of at least one of the games triggers a jackpot payout to players playing that at least one game.

In this specification, where reference is made to a reel in relation to the present invention, or to the nature of, or operation of, a reel (such as the spinning of a reel), the reel may be a simulated reel, that is, an animated image of a reel presented on a display.

In this specification, unless the context clearly indicates otherwise, the term "comprising" has the non-exclusive meaning of the word, in the sense of "including at least" rather than the exclusive meaning in the sense of "consisting only of". The same applies with corresponding grammatical changes to other forms of the word such as "comprise", "comprises" and so on.

BRIEF DESCRIPTION OF THE DRAWINGS

The present invention will now be described by way of example and with references to the accompanying drawings wherein.

PREFERRED EMBODIMENTS OF THE INVENTION

In all embodiments, the invention involves a gaming system for playing of reel-type games, where the system is configured to enable simultaneous betting on several simultaneously played games where the reels of the games can be displayed on a single video display.

Figure 1:
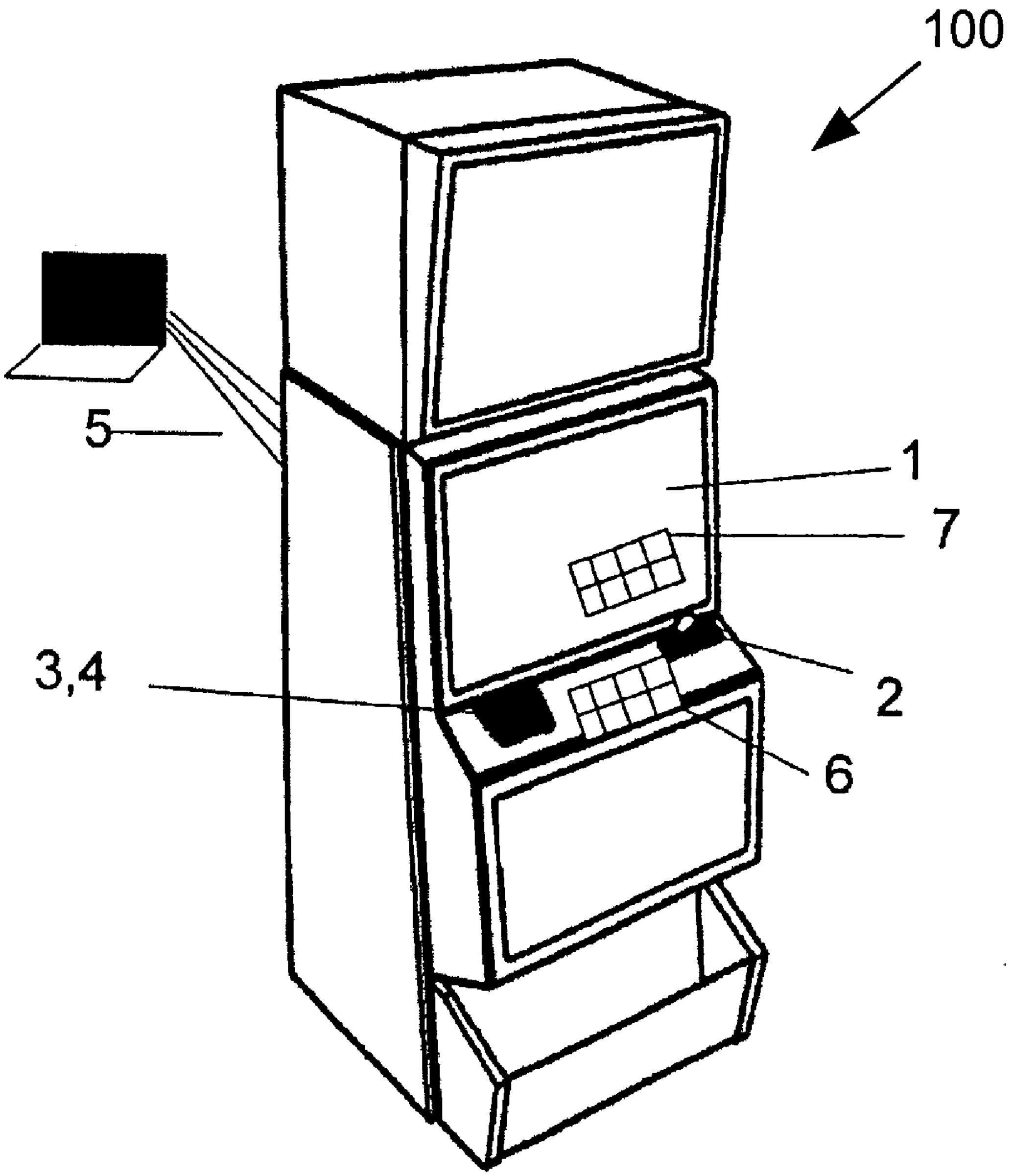
FIG. 1 is a schematic perspective view of a conventional-type slot machine for use with the present invention.

The gaming system 100 according to a first embodiment of the invention may be provided in a conventional-type slot machine 30 as shown in FIG. 1. Accordingly, some features of this embodiment of the gaming system will be described with reference to FIG. 1. However, features of the gaming system according to this first embodiment and feature of other preferred embodiments of the invention will be described further with reference to FIGS. 2 to 8.

Each game according to this first embodiment of the invention is represented by way of a set of reels, each with its own line markers. Where reference is made below to a game being displayed, this relates to the display of the reels of the game, and, where the context allows, the display of other information pertaining to the game.

The gaming system 100 includes a random number generator (not shown) to determine the outcome of each game. Each game that being played is displayed to the player in a respective display window on a video screen 1. The player interacts with the machine 30 by pressing push buttons 6 or touch sensitive selectors 7.

The spin of the simulated reels is controlled by a microprocessor (not shown) that can be housed either in the slot machine 30 itself or externally, for example on a network server.

Figure 2:
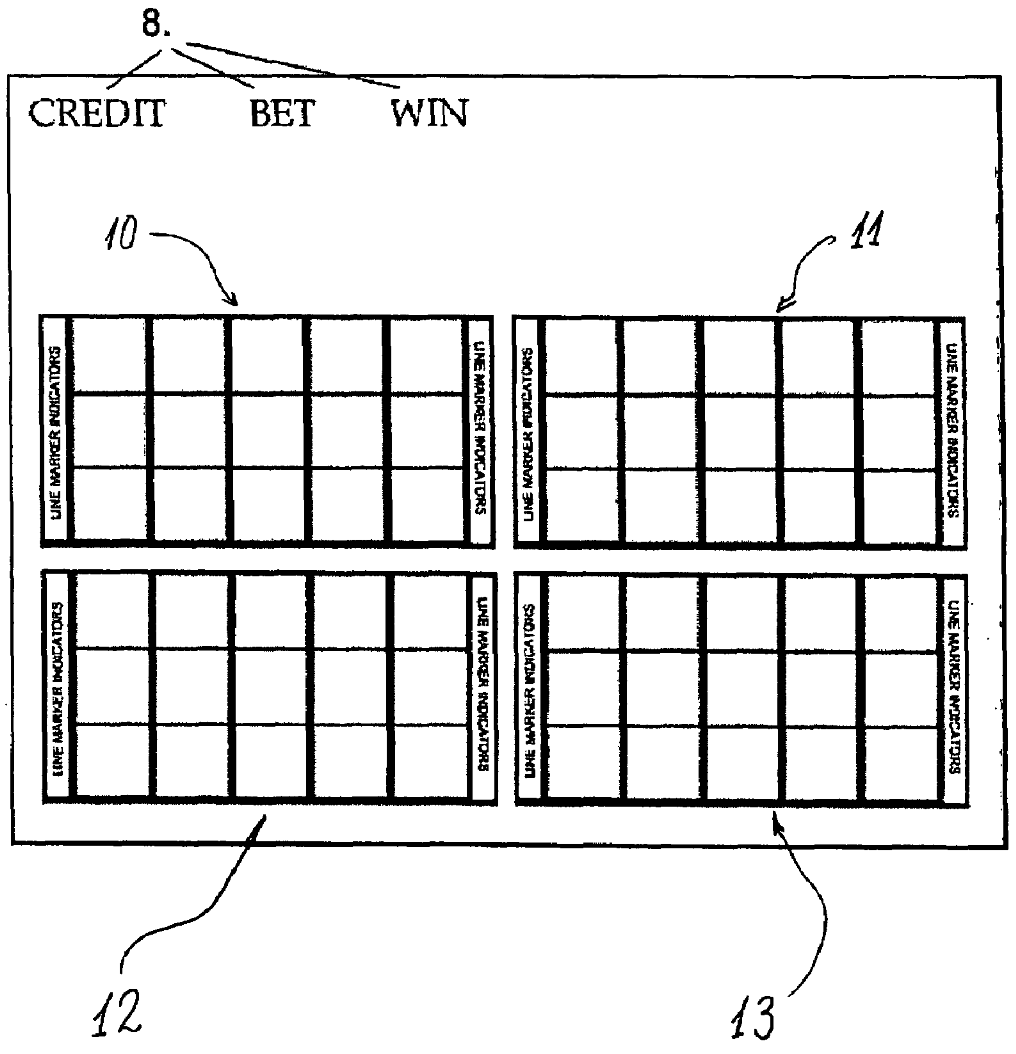
FIG. 2 is a schematic layout of a video screen of a gaming system according to a first embodiment of the present invention, when in playing mode.
Figure 3:
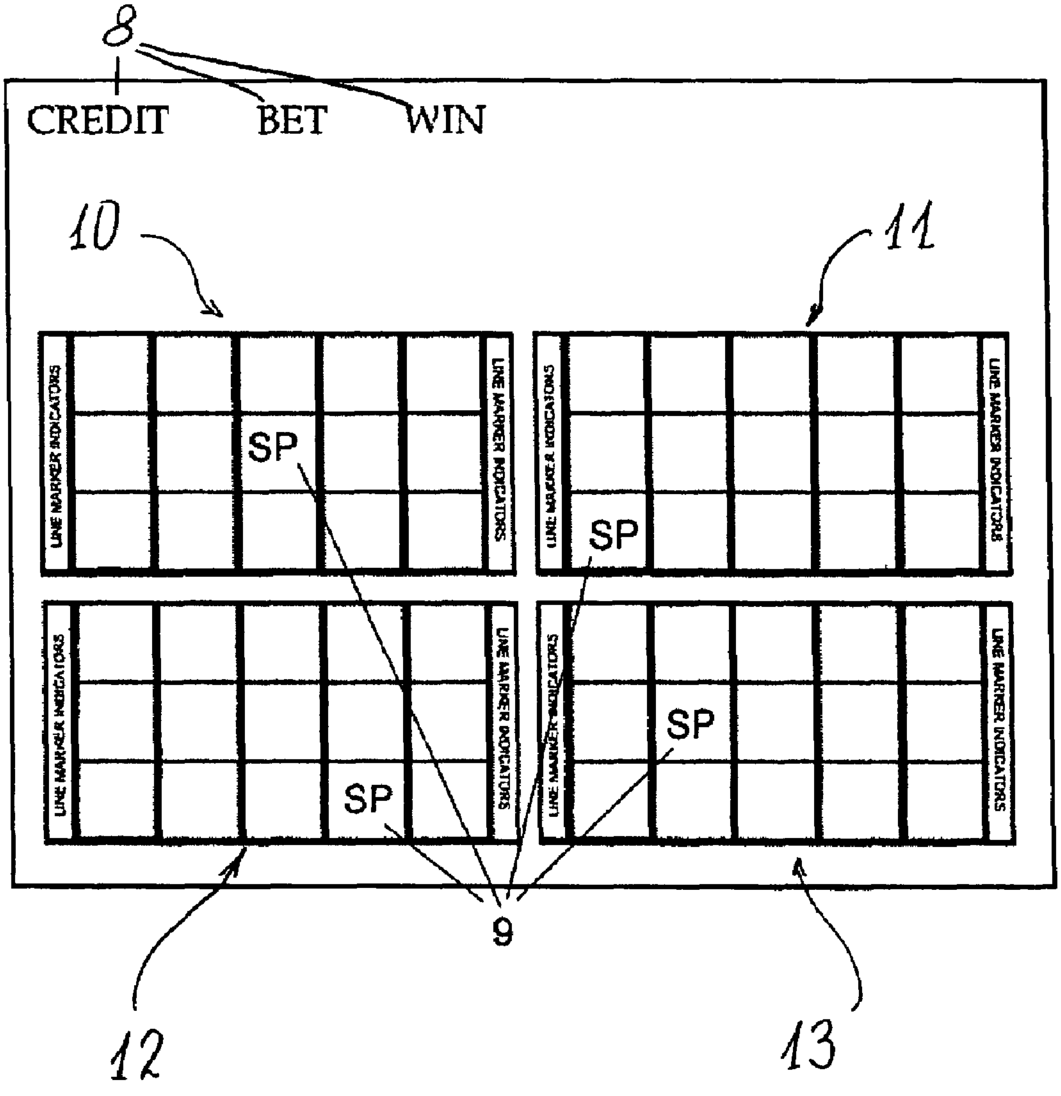
FIG. 3 is a schematic layout of the video screen of FIG. 2, showing special symbols appearing in separate games.

The player selects the number of games to be played by pressing the buttons 6 or selectors 7. As shown in FIGS. 2 and 3, up to four games, displayed respectively in the display windows 10, 11, 12 and 13, may be played at once according to this first embodiment. However, according to other embodiments, as few as two games or up to more than fifty games could be offered for simultaneous playing. According to the first embodiment, all of the games are of the same type, with the same winning probabilities applying, and same symbols being used, in all the games.

Figure 4:
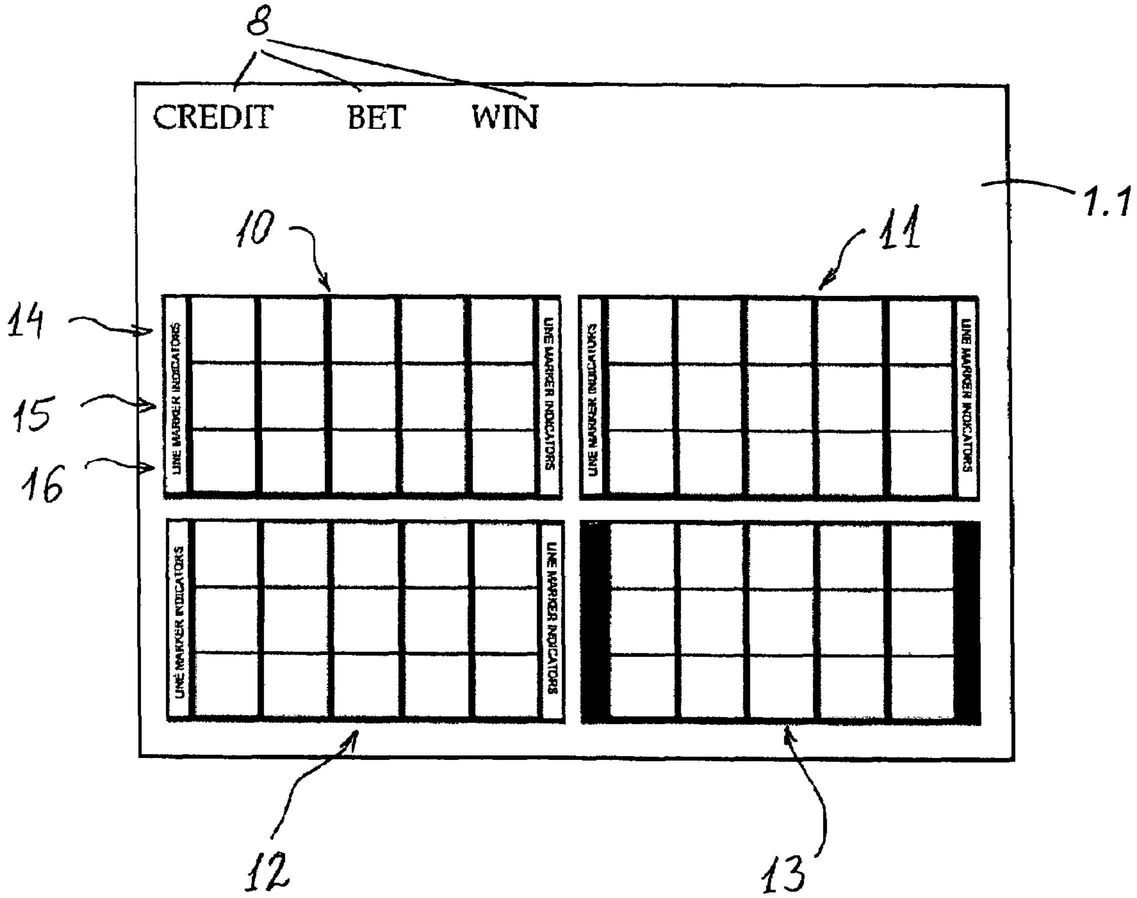
FIG. 4 is a schematic layout of the video screen of FIG. 2, with only three out of four games being selected for playing.

If only one game is selected to be played by a player, the remaining games are still displayed in their respective display windows on the screen 1. However, the line markers of the unselected games are not illuminated while those of the selected game are, thus indicating, on the screen 1, the games that are inactive. This is illustrated in FIG. 4, where only those games presented in the display windows 10, 11 and 12 are selected for playing.

Before a game is initiated, the player presses the buttons 6 or touch screen selectors 7 to select the number of lines to play on each selected game and the number of credits to be bet per line on the selected games. Each of the lines 14 to 16 in the game presented in the display window 10 in FIG. 4 can be selected. According to this embodiment the player selects a particular number of lines to be played and credits to be bet on these lines, and these same parameters apply to all of the selected games. In other embodiments, the player may choose different number of lines and different numbers of credits to bet per line, for the different games that are selected.

As shown for example in FIGS. 2 to 6 there is provided a single status meter 8 which displays the current credits available to the player, the value of the credits that have been bet and the value of the player's winnings. This meter 8 displays the aggregate of all bets placed and wins achieved on all of the games played by the player.

The gaming system 100 can be programmed so that the game is started automatically when the player chooses the number of credits bet per line. Alternatively, a dedicated spin button or selector may be provided to start the game, after all bets have been placed. According to another embodiment, there is provided an automatic mode, in which the games continue to run without interaction by the player.

The display windows 10, 11, 12 and 13 on the screen 1 display the simulated spinning of the reels and the final outcome of each game. The total bet on each game is equal to:

(Number of games played)×(Number of lines played on each game)×(Number of Credits bet on each played line).

According to one version of the present embodiment of the invention, the player has the option of making an additional bet according to which, if a particular predetermined combination of outcomes of one or more of the selected games is achieved, a feature or a bonus round is triggered.

According to the present embodiment, when a game starts, all of the reels begin to spin, including the reels of inactive games, that is, games that are not selected for playing. There is a slight delay between the starting of the respective games.

For each game, the left-most reel is the first to stop spinning. Then, with brief moments in-between, each successive reel, from the left-most reel to the right-most reel, stops spinning. According to another embodiment, the starting and stopping of the spinning of the reels is simultaneous.

The microprocessor's random number generator determines the outcome of each game, with this outcome being displayed in the relevant display window 10, 11, 12, 13. If the player achieves a winning outcome on a game, the player is awarded a prize in relation to that game.

Figure 5:
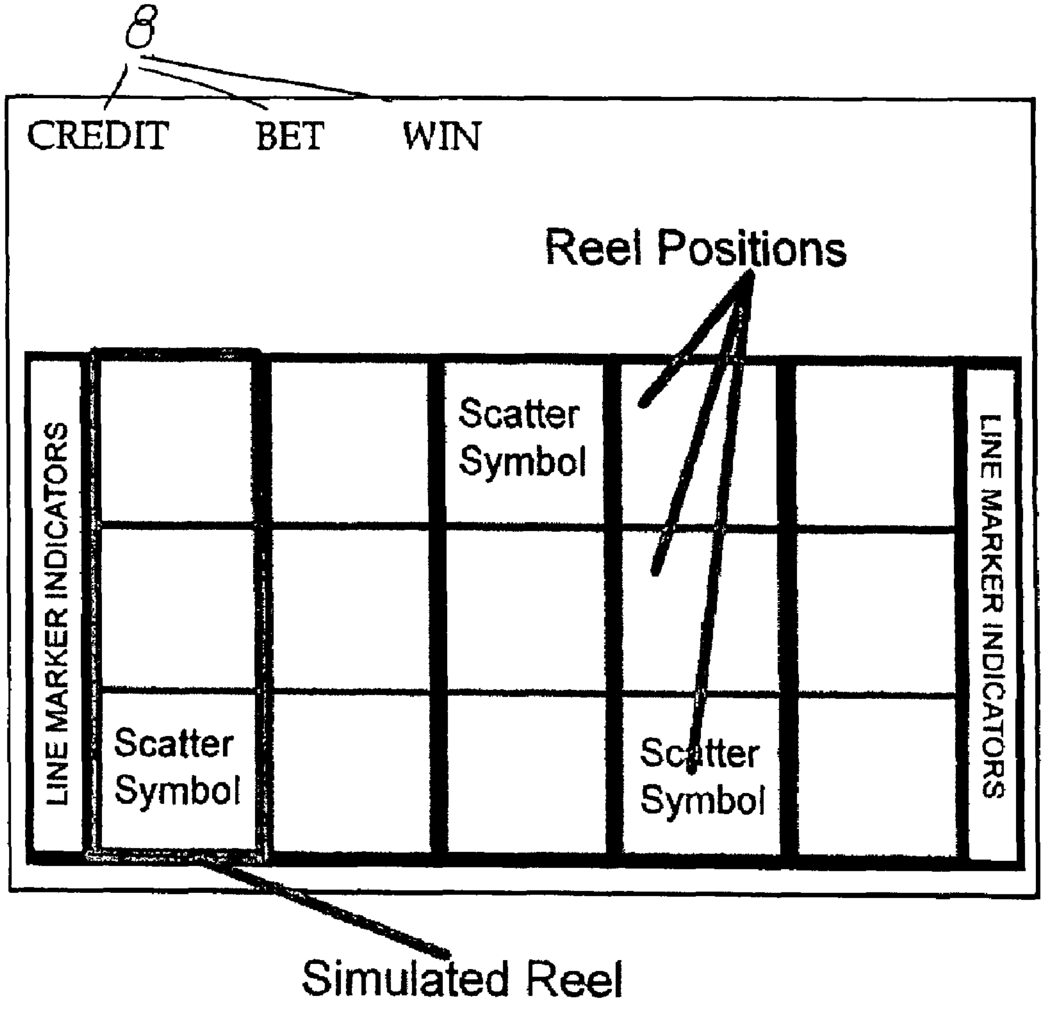
FIG. 5 is a schematic layout of the video screen of FIG. 2 with the display window of only one game being shown.

In the present embodiment, winning outcomes may be based on the symbols appearing on the line on which bets have been placed, and "Scatter Wins", as illustrated in FIG. 5. If "n" games are being played, the total "line" prize awarded is equal to:

[(prize per line for game 1)×(bet per line)]+[prize per line for game 2)×(bet per line)]+ . . . [(prize per line for game n)×(bet per line)].

The total Scatter Win is equal to:

[(total number of lines played on game 1)×(bet per line)×(scatter prize)]+[(total number of lines played on game 2)×(bet per line)×(scatter prize)]+[(total number of lines played on game 3)×(bet per line)×(scatter prize)]+ . . . [(total number of lines played on game n)×(bet per line)×(scatter prize)].

The total of all the line prizes and Scatter Wins for all games played is displayed on the status meter 8.

An important feature of the present embodiment is that, if a number of games are being played on the gaming system 100, and if a feature game is triggered by one of the games being played, the feature phase of that game is allowed to continue while the playing of all the other played games is suspended, until the feature phase is completed. The only game that is continued to be displayed in its display window on the screen 1 during the feature phase is the game in the feature phase, which is typically the game that triggered the feature. In addition, the display window relating to this game expands on the screen 1 so as to fill most of the screen, while the display windows for the suspended games are not displayed during the feature phase. In other embodiments, however, a small portion of the video screen 1 may show a reduced-size image of the display windows of selected games, or other gaming information such as jackpot awards, credit points, advertising information, etc.

The status meter 8 remains in its original position during the feature phase and all the relevant details of the wins achieved during the feature phase are included in the display of the status meter.

If game features are triggered by more than one of the games being played, the feature phases of these games are played one after another, individually. Thus the feature phases are queued. After the last of the sequential feature phases is completed, the suspended games continue to be played, and their display windows revert to their original sizes on the display screen 1.

According to the present embodiment, because many games can be played simultaneously, a game feature can also be triggered when a particular combination or arrangement of symbols from different games is achieved. An example of such a combination is illustrated by the symbols designated 9 in FIG. 4.

Figure 6:
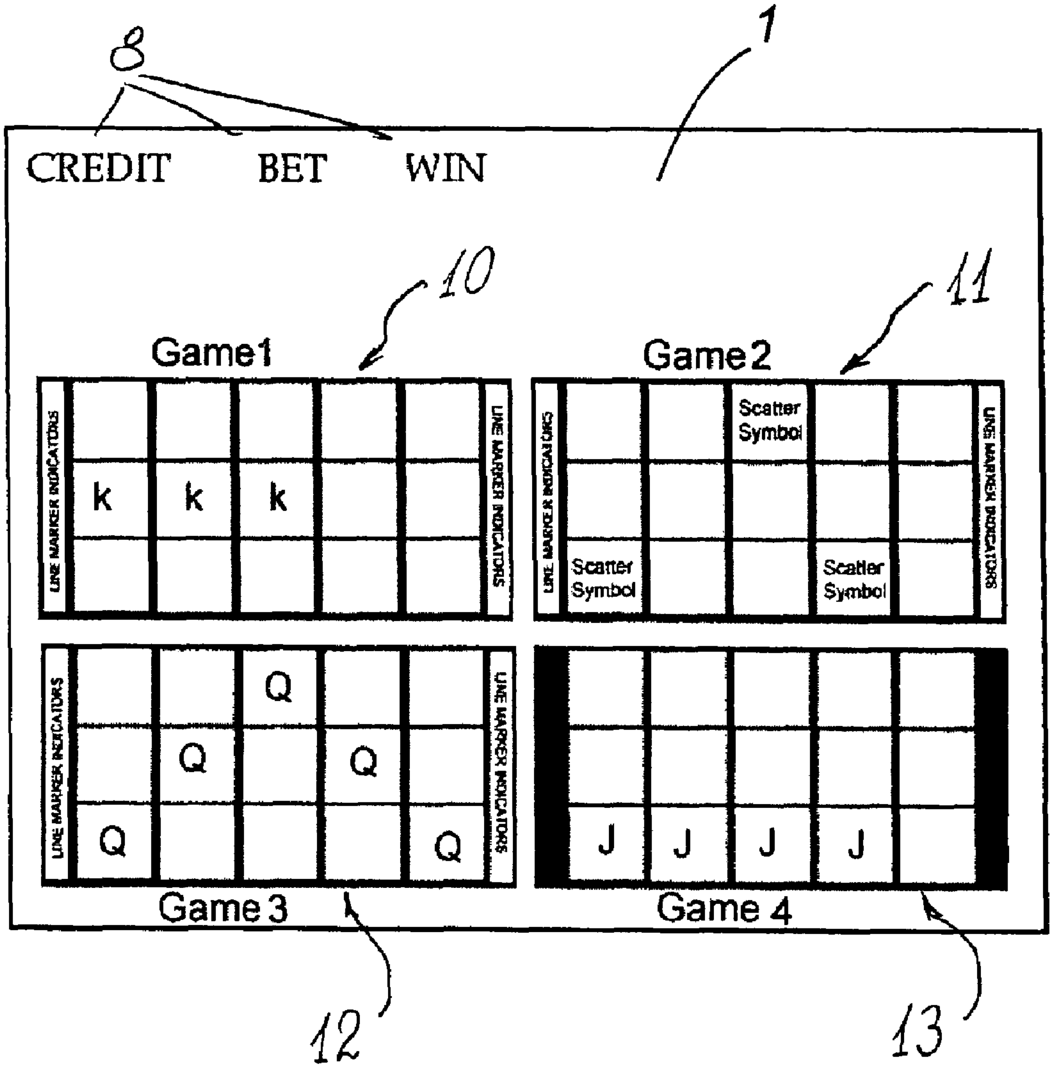
FIG. 6 is a schematic layout of the video screen of FIG. 2, in which display windows on the screen show outcomes of corresponding games.

Referring to FIG. 6, the display windows 10, 11 and 12 illustrate the outcome of the corresponding games as mentioned above in relation to FIG. 4. In particular, the arrangement of three kings ("K") in the game corresponding to the display window 10, and the arrangement of five queens ("Q") in the game corresponding to the display window 12 constitute winning outcomes of the particular games.

Since the player did not select the game corresponding to the display window 13, the arrangement of the four Jacks ("J") in that game do not constitute a winning outcome for the player.

The arrangement of three symbols each shown as "scatter symbol" in the game corresponding to the display window 11 also constitutes a winning outcome of that game, and, according to the present embodiment, the arrangement of these symbols causes a game feature to be triggered. As these symbols are "scatter symbols", they do not need to fall on a particular game line in order to constitute a winning outcome, although they do need to be displayed in an active game, that is, a game that the player selected to play.

As this game corresponding to the display window 11 triggered a feature, the remaining games (corresponding to the display windows 10, 12 and 13) are suspended during the feature phase, while only the feature phase of the game corresponding to the display window 11 is allowed to continue. During the feature phase, the display window 11 expands on the video screen 1 while the display windows 10, 12 and 13 disappear from the video screen. This single display window is illustrated in FIG. 5. At the end of the feature phase, the play of the suspended games resumes, and the corresponding display windows 10, 12 and 13 revert to there original positions on the video screen 1 together with the display window 11, as illustrated in FIG. 4.

Another important embodiment of the present invention will now be described with reference to FIGS. 7 and 8. According to this embodiment, a number of players have access to play the games on the gaming system 100, each player having an individual interface in the form of a player terminal 17.

According to the present embodiment, as in the first embodiment described above in relation to FIGS. 1 to 6, the games are displayed in display windows on a common screen 1.1 to which all of the terminals 17 are connected.

The layout of the video screen 1.1 of this embodiment corresponds to that of the first embodiment of the invention, although there may be different numbers of games, and hence display windows, depending on the particular version of the embodiment. Thus, the layouts shown in FIGS. 4 and 6 also apply to the present embodiment of the invention.

According to the present embodiment, each terminal 17 has its own display screen (not shown). If possible in light of the number of games accommodated by the gaming system according to the present embodiment, the display screens of the individual terminals 17 can be configured to show the display windows of all of the games as shown on the video screen 1.

Each player can choose which games to play, and the particular betting strategy for the selected games, via that player's terminal 17. Thus, for example, where the gaming system enables a total of nine games to be played simultaneously, each player may choose to play two of the nine games, a total of 25 lines, and to bet three credits per line. Another player, for example, may choose to play all nine games, a total of 25 lines, and to bet ten credits per line.

However, in another preferred embodiment, all of the players would be limited to playing all of the available games, to ensure equal participation by the players.

Wins are allocated to each player according to the bets placed by the player at the player's respective terminal 17.

If a feature is triggered by any one of the games being played, the play of the remaining games will be suspended, the size of the display window of the triggering game will be expanded to fill a larger portion of, or even substantially the entirety of, the video screen 1.1, and players that were playing the triggering game will be able to continue playing the feature phase of that game in accordance with their respective chosen betting criteria.

According to a third embodiment of the invention, the gaming system is configured to enable games to be played on a personal computer (not shown). The computer can enable playing on that computer alone, or on a number of computers connected via a network, such as the Internet.

According to the above embodiments, the probability of a feature being triggered is the same for each game whether that game is played alone or simultaneously with other games. However, in the normal situation where a number of games are played simultaneously, the fact that numerous games are being played will result in features being triggered more often than if one game were being played alone.

In some instances, for example, if four games are played simultaneously, a feature may be triggered approximately four times more often that if any one of those games was played alone.

As will be appreciated by those skilled in the art, these are general trends that depend on statistical probabilities and relate to average frequencies over extended periods of time. These averages therefore may not correspond exactly to the frequency of corresponding events over shorter periods of time.

It will further be appreciated that, increasing the number of games played simultaneously should result in features being triggered more often, even if the frequency of triggering by any one game is the same as that of all of the other games.

The increased number of features triggered as a result of numerous games being played simultaneously results in increased entertainment value for players and assists in maintaining the interest of players in playing the games.

In addition, it will be appreciated that the value of bets placed by a player for numerous games played simultaneously is the aggregate of the bets placed on each of the games. Thus, where the gaming system according to the present embodiment is implemented on a conventional slot machine, prize tables of that machine which determine prize amounts based on the value of bets placed by players, do not need to be modified to accommodate the features of the present embodiment, insofar as those prize tables apply to each of the games available to be played simultaneously.

It is also possible for the microprocessor to be programmed to reduce the probability of a feature being triggered by at least one of the games when that game is played simultaneously with a large number of other games, relative to the probability of the game triggering a feature when the game is played alone.

In this case, when numerous games are played simultaneously, even though the probability of a feature being triggered by any one or more games is reduced, the fact that numerous games are being played means that there should be an overall increase in the frequency of features being triggered. Thus, players will still be left with the impression that the features occur more often than usual and may be encouraged to continue playing.

Similar considerations apply to the awarding of prizes. Where numerous games are played simultaneously, prize awards should occur more often than if any one game were played alone. Since this may result in a player being left with the impression of a larger overall prize award, the value of the prize relating to each game can be made smaller, when that game is played simultaneously with other games, than the value of that prize when the game is played alone.

Alternatively, in other embodiments, the value of the prize relating to each of the games, during simultaneous playing, can be larger than the value of the prize when the respective game is played alone. This feature may be used in a case where the probability of features being triggered in any of the simultaneously played games is reduced when compared with the probability when the respective game is played alone.

According to the preferred embodiments, a portion of the bets placed on each of the simultaneously played games is allocated to a jackpot pool, and these games are configured, when predetermined criteria are met, to trigger a jackpot payout.

By presenting only feature-triggering games on the video screen as described above, the enjoyment and excitement experienced by players as a result of a feature being triggered should not be negated by the fact that numerous games are being played together.

Figure 7:
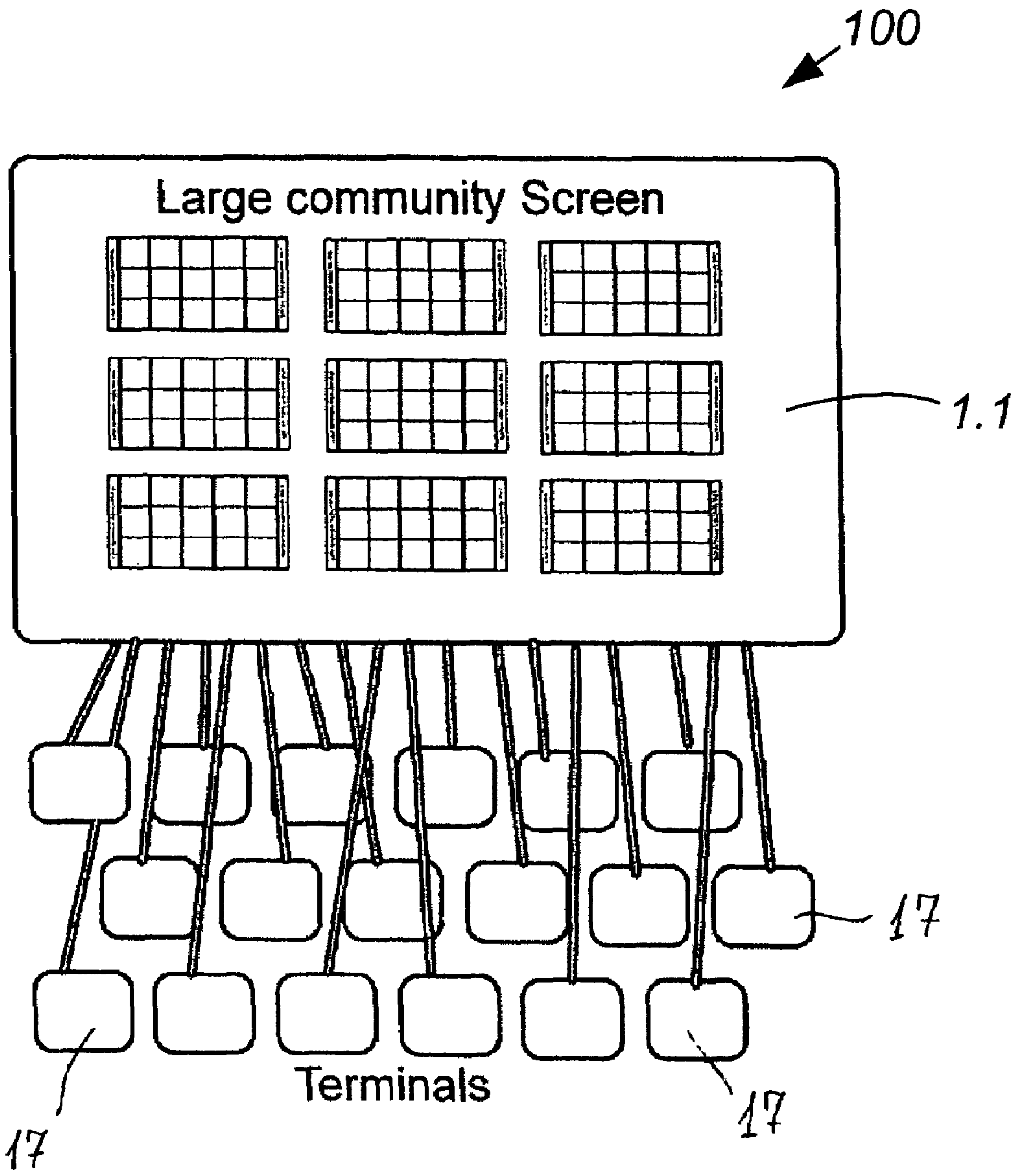
FIG. 7 is a schematic diagram of a video screen layout according to a second embodiment of the invention, with multiple player terminals being connected to the screen and multiple game display windows being shown on the screen.
Figure 8:
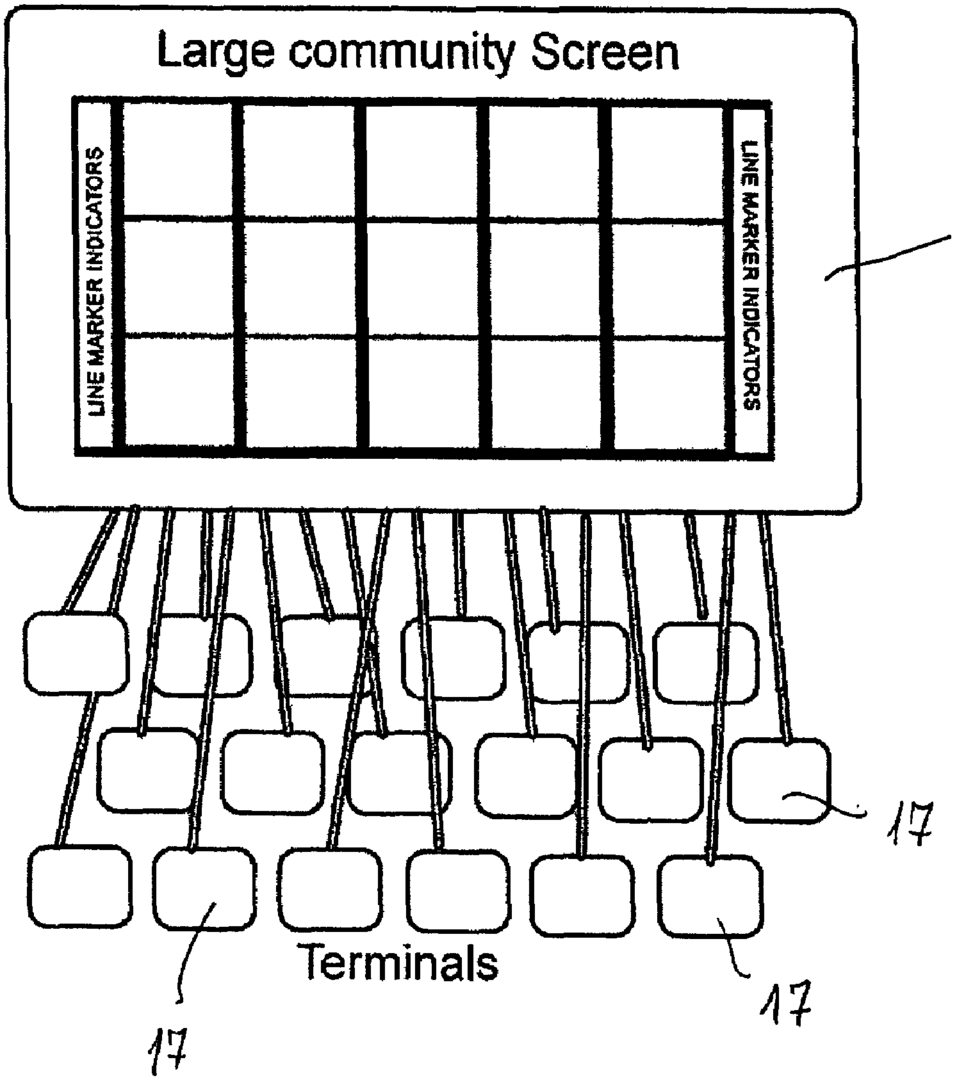
FIG. 8 is a schematic diagram of the video screen and terminals of FIG. 7, with only a single game display window being shown on the screen during a feature phase of the corresponding game.
Figure 9:
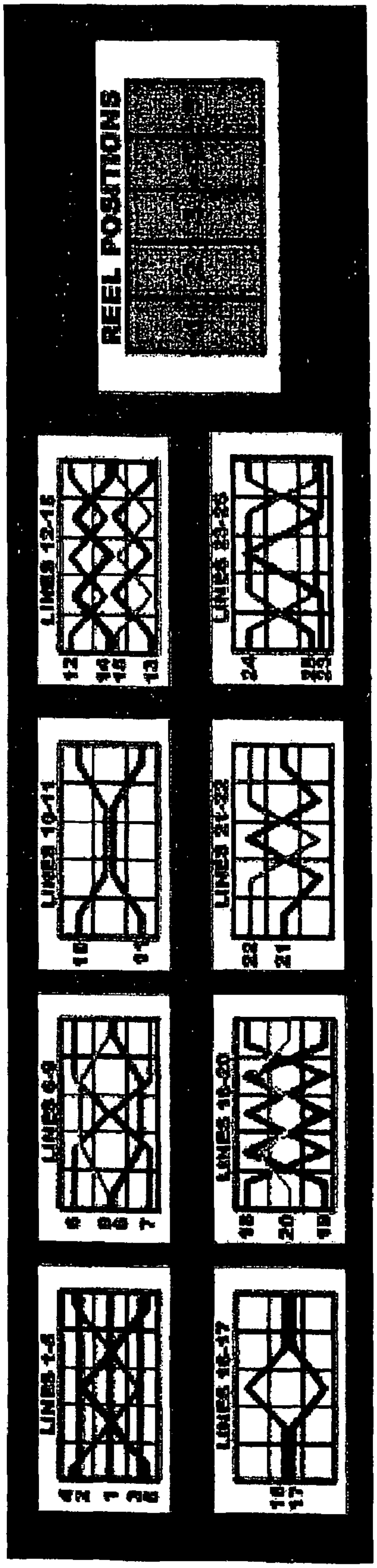
FIG. 9 is a diagram illustrating an arrangement of juxtaposed gaming system reels, and various examples of play "lines" of reel-type games.

In addition, according to the embodiment described in relation to FIGS. 7 and 8, the ability of numerous players to play games simultaneously via the terminals 17 allows the players to share their gaming experiences with one another, which can enhance player enjoyment, especially when bonus points or other game features are won.

Although the invention is described above with reference to specific embodiments, it will be appreciated by those skilled in the art that it is not limited to those embodiments, but may be embodied in many other forms.

For example, bonuses or features may be awarded in different ways to those described above. In particular, a bonus might be associated with the combined outcomes of all of the games. Thus, if the outcomes of all of the games played involved the presentation of a particular common symbol, this could trigger a special bonus. This could be a particularly beneficial way of awarding major jackpots that typically require very high odds.

In another example, prizes can be awarded for game outcomes involving "scatter symbols" even if one or more of the "scatter symbols" appears as part of the outcome of a non-active game (i.e. a game that was not selected by a player).

In another example, instead of all of the available games being of an identical type to one another, the gaming system may be configured for the simultaneous playing of numerous games or different types.

In addition, while the preferred embodiments were described in the context of electronic games having simulated reels, mechanical reels might also be used, for example where the duration of the spinning of the reels is mechanically determined on the basis of a random, or pseudo-random, event.

The invention claimed is:

1. An electronic gaming system for use by a player, the system comprising:

at least one player interface configured to enable the player to interact with the electronic gaming system;

a main video display screen; and a random number generator, wherein the electronic gaming system enables the player to simultaneously play a plurality of reel-type games and to select parameters of said plurality of reel-type games, said parameters including at least one game line with respect to which the player places bets and an amount of money which the player bets per line, and wherein the system is configured to have a plurality of display windows appear simultaneously on the main video display screen, each of said plurality of display windows associated with a respective one of the simultaneously played reel-type games and configured to display a plurality of reels pertaining to the respective reel-type game, each reel having a plurality of reel indicia arranged circumferentially thereon, and wherein the system is configured to have the random number generator determine a particular outcome for each play of each of said simultaneously played reel-type games, each particular outcome being one of a plurality of possible outcomes and constituted by a particular arrangement of indicia of the reels, and wherein the system is configured to display a particular reel-type game of said plurality of simultaneously played reel-type games in a particular display window, and to have the particular reel-type game enter a feature phase when the particular outcome of said particular reel-type game constitutes a predetermined feature-triggering event, the feature phase being displayed in the particular display window, and wherein, in response to the occurrence of the predetermined feature-triggering event, the system is configured to automatically perform a number of operations that include i) modifying all of the display windows on the main display screen until the feature phase is completed except the particular display window associated with the particular reel-type game which has entered the feature phase such that all of the display windows except the particular display window are reduced in size or disappear from the main display screen, and additionally modifying the size of said particular display window such that the particular display window increases in size on the main display screen, at least until the feature phase is completed, and ii) suspending play of all of the reel-type games other than said particular reel-type game until the feature phase is completed.

2. The electronic gaming system of claim 1, wherein:

the size of said particular display window increases on the main display screen to occupy substantially the entire main display screen during said additionally modifying.

3. The electronic gaming system of claim 1, wherein:

said system is configured to resume play of said suspended games after the feature phase of said particular game is completed.

4. The electronic gaming system of claim 1, wherein:

the feature-triggering event is constituted by a first predetermined outcome of said particular game and a second predetermined outcome of at least one additional game of said plurality of real type games.

5. The electronic gaming system of claim 1, wherein:

the feature-triggering event is constituted solely by the predetermined outcome of said particular game.

6. The electronic gaming system of claim 1, further comprising;

a slot machine, said slot machine including the main display screen and the player interface.

7. The electronic gaming system of claim 1, wherein:

said at least one player interface includes a plurality of player interfaces configured to enable each of a plurality of players to simultaneously, play at least one of said plurality of reel-type games on the electronic gaming system.

8. The electronic gaming system of claim 7, wherein:

each player interface comprises a display configured to indicate status of bets placed and credits awarded for said plurality of reel-type games.

9. The electronic gaming system of claim 7, wherein:

said system is configured to allow a given player of said plurality of players to continue to play said particular game which has entered said feature phase only if said given player had been playing said particular game prior to said particular game entering said feature phase.

10. The electronic gaming system of claim 7, wherein:

the system is configured to enable each of said plurality of players to play the at least one reel-type game in accordance with game parameters entered by each player.

11. The electronic gaming system of claim 7, further comprising:

a plurality of slot machines, each of said plurality of slot machines including one of said plurality of player interfaces.

12. The electronic gaming system of claim 7, wherein:

each player interface comprises a terminal screen, and the electronic gaming system is configured to display said plurality of display windows simultaneously on each terminal screen being used to play said reel-type games.

13. The electronic gaming system of claim 1, further comprising:

a personal computer configured to enable simultaneous playing of said plurality of reel-type games.

14. The electronic gaming system of claim 13, wherein:

the personal computer is connected to additional personal computers on a network and configured to enable simultaneous play of said plurality of reel-type games via the network.

15. The electronic gaming system of claim 14, wherein:

the network includes a global wide area network.

16. The electronic gaming system of claim 1, wherein:

a given reel type game of said plurality of simultaneously played reel type games has a probability of entering a feature phase, and said probability is lower when said given reel type game is played simultaneously with at least one other reel type game than when only said given reel type game is played.

17. The electronic gaming system of claim 1, wherein:

said system is configured to award a prize in response to the occurrence of a predetermined winning outcome of one of said plurality of reel type games, said prize has a value, and said value is smaller when said one game is played simultaneously with at least one additional game of said plurality of reel type games than when only said one game is being played.

18. The electronic gaming system of claim 1, wherein:

said system is configured to allocate a portion of an amount bet by each player with respect to a given reel type game of said plurality of simultaneously played reel type games to a jackpot pool, and to trigger a jackpot payout upon the occurrence of a predetermined outcome of at least one of said plurality of reel type games.

19. An electronic gaming system for use by a player, the system comprising:

a plurality of reel type games configured to be played simultaneously;

at least one player interface configured to enable the player to interact with the electronic gaming system to select one or more of said plurality of reel type games for simultaneous play thereof as well as to set parameters for said selected reel type games;

a main video display screen; and a random number generator, wherein said parameters include at least one game line with respect to which the player may place bets and an amount of money which the player may bet per line, and wherein the system is configured to display a plurality of display windows simultaneously on the main video display screen, each of said plurality of display windows associated with a respective one of the simultaneously played reel-type games and configured to display a plurality of reels pertaining to the respective reel-type game, each reel having a plurality of reel indicia arranged circumferentially thereon, and wherein the system is configured to have the random number generator determine a particular outcome for each play of each of said simultaneously played reel-type games, each particular outcome being one of a plurality of possible outcomes and constituted by a particular arrangement of indicia of the reels, and wherein the system is configured to display a particular reel-type game of said plurality of simultaneously played reel-type games in a particular display window, and to have the particular reel-type game enter a feature phase when the particular outcome of said particular reel-type game constitutes a predetermined feature-triggering event, the feature phase being displayed in the particular display window, and wherein, in response to the occurrence of the predetermined feature-triggering event, the system is configured to automatically perform a number of operations that include i) modifying all of the display windows on the main display screen until the feature phase is completed except the particular display window associated with the particular reel-type game which has entered the feature phase such that all of the display windows except the particular display window are reduced in size or disappear from the main display screen, and additionally modifying the size of said particular display window such that the particular display window increases in size on the main display screen until the feature phase is completed, and ii) suspending play of all of the reel-type games other than said particular reel-type game until the feature phase is completed.

* * * * *